United States Patent
Mohammed Amin et al.

(10) Patent No.: US 9,172,945 B2
(45) Date of Patent: Oct. 27, 2015

(54) METHOD OF CREATION OF A VIRTUAL THREE DIMENSIONAL IMAGE TO ENABLE ITS REPRODUCTION ON PLANAR SUBSTRATES

(76) Inventors: Azmi Bin Mohammed Amin, Selangor D.E. (MY); Chong Joo Jimmy Bong, Melaka (MY)

(*) Notice: Subject to any disclaimer, the term of this patent is extended or adjusted under 35 U.S.C. 154(b) by 951 days.

(21) Appl. No.: 12/529,529

(22) PCT Filed: Feb. 27, 2008

(86) PCT No.: PCT/MY2008/000015
§ 371 (c)(1),
(2), (4) Date: Sep. 1, 2009

(87) PCT Pub. No.: WO2008/105650
PCT Pub. Date: Sep. 4, 2008

(65) Prior Publication Data
US 2010/0020072 A1 Jan. 28, 2010

(30) Foreign Application Priority Data
Mar. 1, 2007 (GB) .................................. 0704002.5

(51) Int. Cl.
*G06T 15/00* (2011.01)
*H04N 13/02* (2006.01)

(52) U.S. Cl.
CPC ................................ *H04N 13/0275* (2013.01)

(58) Field of Classification Search
USPC ........................................................ 345/419
See application file for complete search history.

(56) References Cited

U.S. PATENT DOCUMENTS

2005/0253924 A1  11/2005  Mashitani
2005/0275915 A1  12/2005  Vesely et al.

FOREIGN PATENT DOCUMENTS

JP  2000215325 A  8/2000
JP  2005346417 A  12/2005
JP  2006301654 A  11/2006

OTHER PUBLICATIONS

Japanese Patent Translation—2005-346417.*

(Continued)

*Primary Examiner* — James A Thompson
*Assistant Examiner* — Wynton S Jones
(74) *Attorney, Agent, or Firm* — Maier & Maier, PLLC (57) ABSTRACT

A method of creation of a virtual three dimensional image to enable its reproduction on at least one planar substrate includes creating a virtual three dimensional space that includes a ground plane. A virtual model of an object is merged into the virtual three dimensional space and located at a desired position on the ground plane. A first virtual camera is placed at a first position in the virtual three dimensional space. Virtual lighting is added to the virtual three dimensional space to create shadows of the virtual model on at least the ground plane. The first virtual camera is used for rendering of the virtual model and the shadows to obtain a rendered image. The virtual model is removed and the rendered image is projected onto the ground plane. A second virtual camera is placed vertically above the projection of the rendered image on the ground plane and is used to capture the virtual three dimensional image of the projection of the rendered image on the ground plane to enable reproduction of the virtual three dimensional image on the at least one planar substrate.

12 Claims, 11 Drawing Sheets

(56) References Cited

OTHER PUBLICATIONS

"3D Sony Ericsson Floor Advert", http://www.esate.com/news/3d-sony-ericsson-floor-advert-951, May 27, 2006, retrieved on May 2, 2012, 1 pg.

"Anamorphosis", Wikipedia, http://en.wikipedia.org/w/index.php?title=Anamorphosis&oldid=110979790, Feb. 26, 2007, retrieved May 2, 2012, 4 pgs.

Kent, Phillip, "Anamorph Me! User's Guide" http://www.anamorphosis.com/UsersGuide.pdf, Mar. 20, 2002, retrieved May 2, 2012, 16 pgs.

* cited by examiner

METHOD OF CREATION OF A VIRTUAL THREE DIMENSIONAL IMAGE TO ENABLE ITS REPRODUCTION ON PLANAR SUBSTRATES

TECHNICAL FIELD

This invention relates to a method of creation of a virtual three dimensional image to enable its reproduction on a planar substrate and refers particularly, though not exclusively, to such a method for creation of planar advertisements with a three-dimensional appearance be reproduced on a planar substrate than can be laid on a flat surface such as a floor.

BACKGROUND

There have been a number of proposals for the creation of a three dimensional image on a planar surface to enable more dynamic advertisements to be placed in strategic locations. Most such proposals are relatively complex, do not produce the desired result, or are not easily reproducible.

SUMMARY

According to a preferred aspect there is provided a method of creation of a virtual three dimensional image to enable its reproduction on at least one planar substrate includes creating a virtual three dimensional space that includes a ground plane. A virtual model of an object is merged into the virtual three dimensional space and located at a desired position on the ground plane. A first virtual camera is placed at a first position in the virtual three dimensional space. Virtual lighting is added to the virtual three dimensional space to create shadows of the virtual model on at least the ground plane. The first virtual camera is used for rendering the virtual model and the shadows to obtain a rendered image. The virtual model is removed and the rendered image is projected onto the ground plane. A second virtual camera is placed vertically above the projection of the rendered image on the ground plane and is used to capture the virtual three dimensional image of the projection of the rendered image on the ground plane to enable reproduction of the virtual three dimensional image on the at least one planar substrate.

Preferably, scaling of the virtual model takes place before adding the virtual lighting.

The desired position may be a centre of the virtual three dimensional space. The virtual model of the object may be surface textured before being merged into the virtual three dimensional space.

The first position may be:
(i) remote from the desired position,
(ii) a predetermined height above the ground plane, and
(iii) a predetermined distance from the desired position;

The first position may be an average height of human eyes above ground level thereby representing a viewer's position. The predetermined distance may be in the range 1 to 10 meters. The object may comprise a plurality of individual objects. Scaling may be performed for retention of correct proportionality in the size of the virtual model of each of the individual objects.

The virtual three dimensional image may have a length and width that are the same. The projection of the rendered image may be by a virtual light projector from the position of the first virtual camera. The second virtual camera may be a virtual orthographic camera.

The virtual three dimensional space may use actual measurement units of the reproduced image on the substrate for height, length and width.

The virtual lighting may be above the ground plane at a height greater than the predetermined height. The virtual lighting may be between the desired position and the first position. The virtual lighting may comprise a plurality of virtual light sources. The second virtual camera may be above a centre of the projection of the rendered image.

The planar substrate may be one of: a transparency, and decalamania. The planar substrate may be able to be mounted on at least one of: a pavement, a ground, a sidewalk, and a floor.

The ground plane may comprise a rectangular grid. The first virtual camera may focus on a plane on the ground plane at the desired position, the plane being perpendicular to and centred on a longitudinal axis of a line of sight of the first virtual camera.

The method may further comprise adding a biped image to the virtual three dimensional space before adding the virtual lighting with the biped image having a height such that eyes of the biped image are the predetermined distance above the ground plane and are at the first position.

Rescaling of the virtual model may be to the correct size for the final reproduction on the planar substrate.

Before projecting the rendered image onto the ground plane the virtual three dimensional space may be scaled to enable the projection of the rendered image onto the ground plane to be of the correct size for the reproduction of the virtual three dimensional image on the planar substrate. Projecting the rendered image onto the ground plane may be by placing a virtual projection camera in the virtual three dimensional space at the first position and adding a virtual projection light source to the virtual three dimensional space also at the first position; the virtual projection light source and the virtual projection camera being aligned. A central, longitudinal axis of the virtual projection light source and the virtual projection camera may be coincident with the longitudinal axis of a line of sight of the first virtual camera. Spotlight parameters of the virtual projection light source may be adjusted to be the same as an angle of field of the virtual projection camera. Spotlight parameters may include beam angle.

The virtual projection light source and the virtual projection camera may be combined to form a virtual projector, the rendered image being attached to the virtual projector and projected onto the ground plane to give a distorted, projected rendered image. The second virtual camera may be added to the virtual three dimensional space vertically above the projection of the rendered image with its angle of field according to the dimensions of and distance from the projection of the rendered image. The virtual projection camera may comprise one of: the first virtual camera, and an alternative virtual camera. It may be an orthographic virtual camera.

BRIEF DESCRIPTION OF THE DRAWINGS

In order that the invention may be fully understood and readily put into practical effect there shall now be described by way of non-limitative example only preferred embodiments of the present invention, the description being with reference to the accompanying illustrative drawings.

In the drawings.

DESCRIPTION OF EXEMPLARY EMBODIMENTS

In all drawing figures, the prefix number indicates the drawing figure in which the relevant feature is added.

Figure 1:
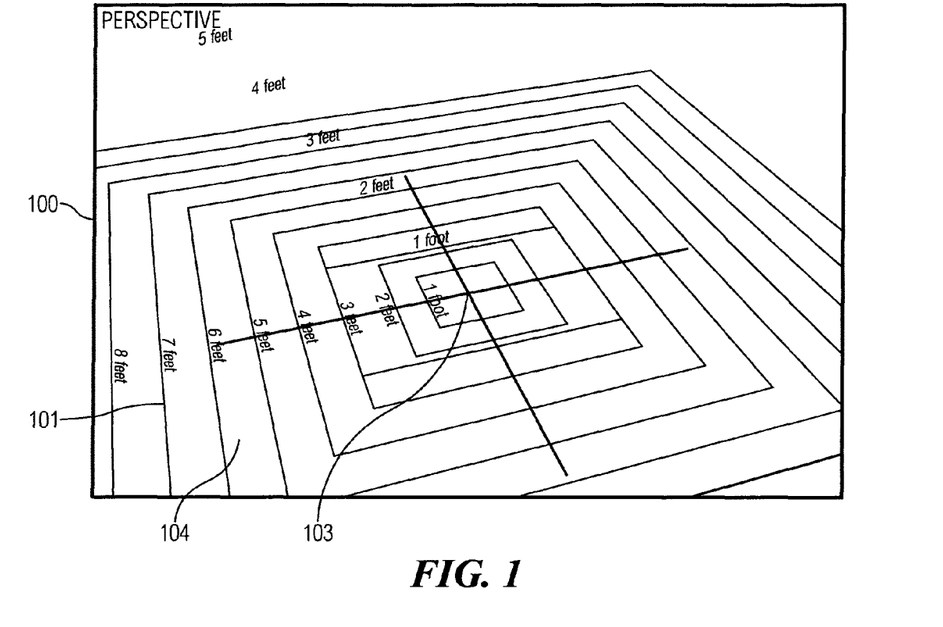
FIG. 1 is a first screen shot at a first stage in an exemplary form of the methodology.
Figure 18:
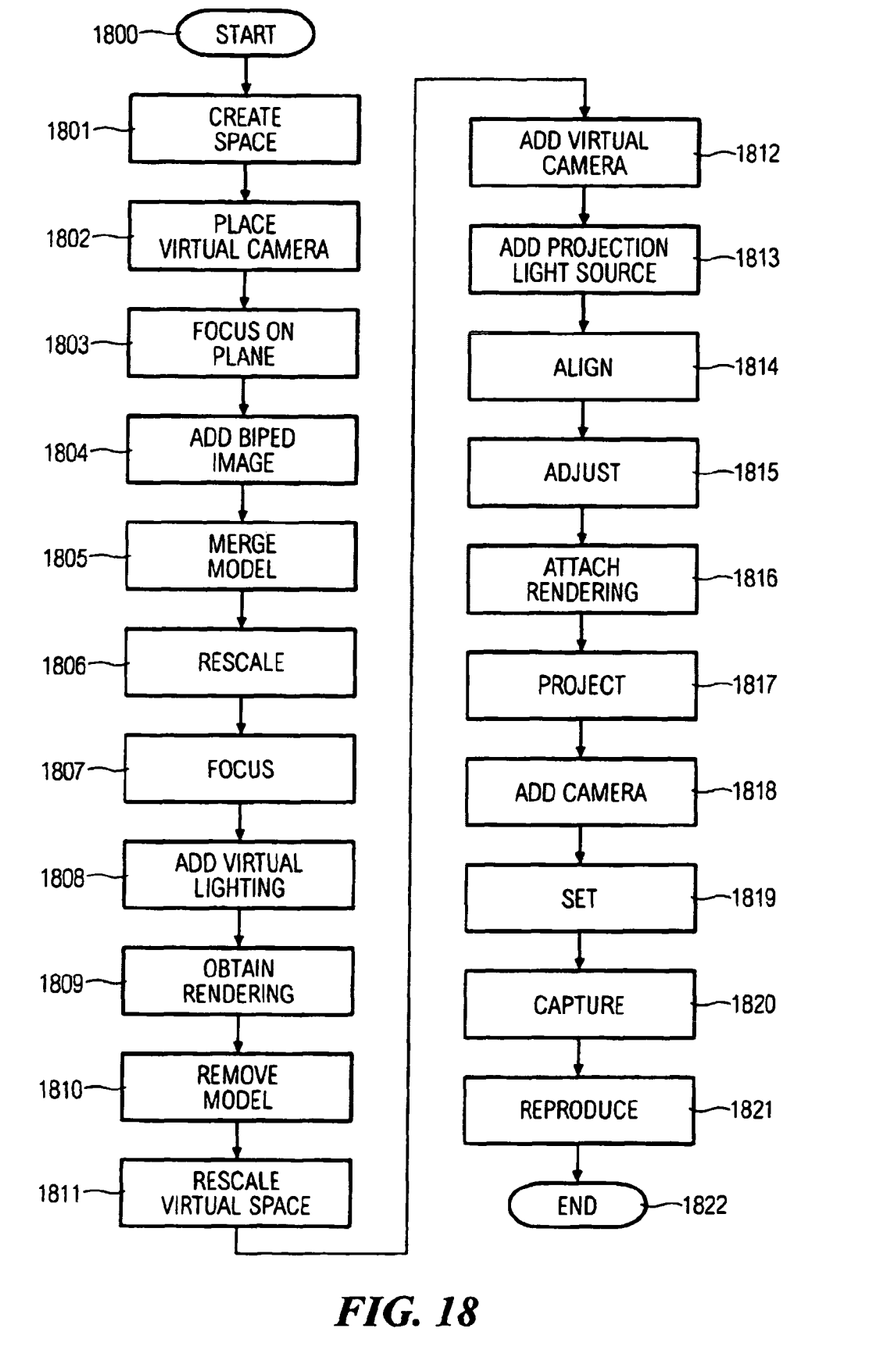
FIG. 18 is a flow chart of the exemplary aspect of the methodology.

To refer to FIGS. 1 and 18 there is shown the first stage of the method for creation in a computer of a virtual three dimensional image of an object to enable its reproduction on planar substrates. The planar substrates may be a transparency or decalamania. Preferably, the planar substrate may be able to be mounted on a pavement, ground, sidewalk, floor, or other suitable flat surface. Reproduction may be by printing or the like.

In the first stage (1801) a virtual three dimensional space 100 is created that includes a ground plane 101. The virtual three dimensional space 100 incorporates actual measurement units of the reproduction on the planar substrate for height, length and width. In this way the virtual three dimensional space can be considered as if in "the real world" irrespective of the size of the computer monitor or screen/display on which it is displayed. The virtual three dimensional space 100 has a desired position for placement of a virtual object and this is preferably the centre 103. A rectangular grid 104 is preferably reproduced on the ground plane 101.

Figure 2:
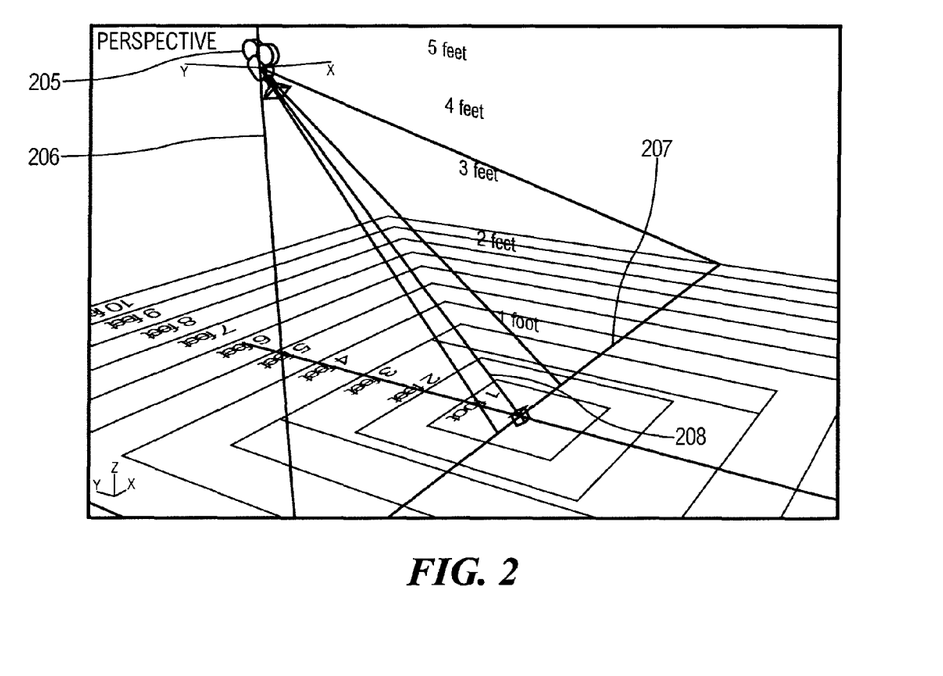
FIG. 2 is a second screen shot at a second stage in an exemplary form of the methodology.

A first virtual camera 205 is created and placed at a first position 206 in the virtual three dimensional space 100 (1802). The first virtual camera 205 is placed at first position that is remote (i.e. spaced from) from the desired position 103, a predetermined height above the ground plane 101, and a predetermined distance from the desired position 103. The predetermined height is preferably the height of a human eye above the ground plane 101, more preferably the height of the centre of the eye. This is normally about 1.67 meters (5 feet 6 inches) above the ground plane 101. The predetermined distance will depend greatly on the proposed location of the planar substrate. If, for example, the planar substrate is to be located on a supermarket floor, the predetermined distance will be approximately 2 meters. If on a concourse of an airport or railway station, it might be 2 to 5 meters; and on a sidewalk may be up to 10 meters. On a playing field it may be much more. It therefore represents a viewer's position—the position from which the final three dimensional image is to be viewed.

The virtual camera 205 focuses on a plane 207 that is mounted on the ground plane 101 at the centre 103 and that is perpendicular to and centred on the longitudinal axis 208 of the line of sight of the virtual camera 205 (1803).

Figure 3:
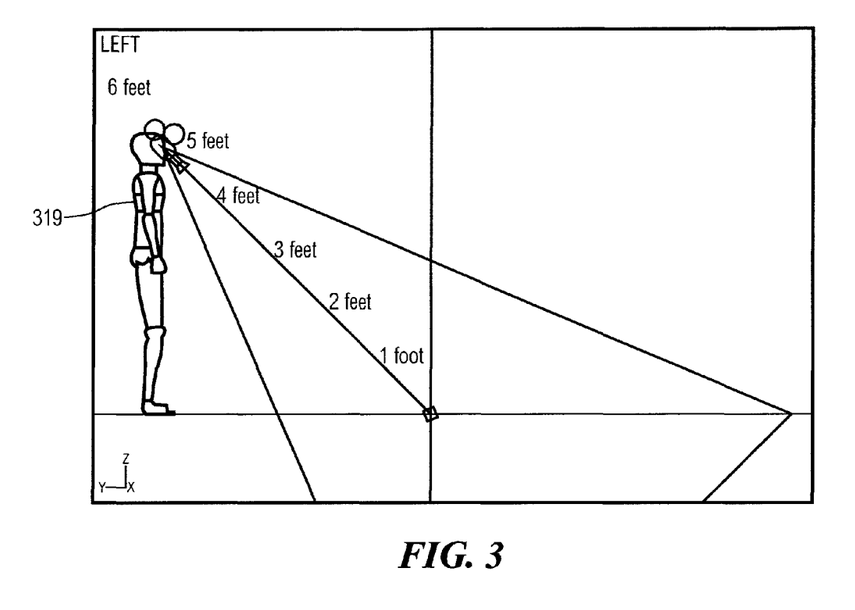
FIG. 3 is a third screen shot at a third stage in an exemplary form of the methodology.

A biped image or a human three-dimensional model 319 is then added to the virtual three dimensional space 100 with its height being such that the eyes, preferably the centre of the eyes, are the predetermined distance above the ground plane 101 and are at the first position 206 (1804). This assists in the accurate location of the virtual camera 205.

Figure 4:
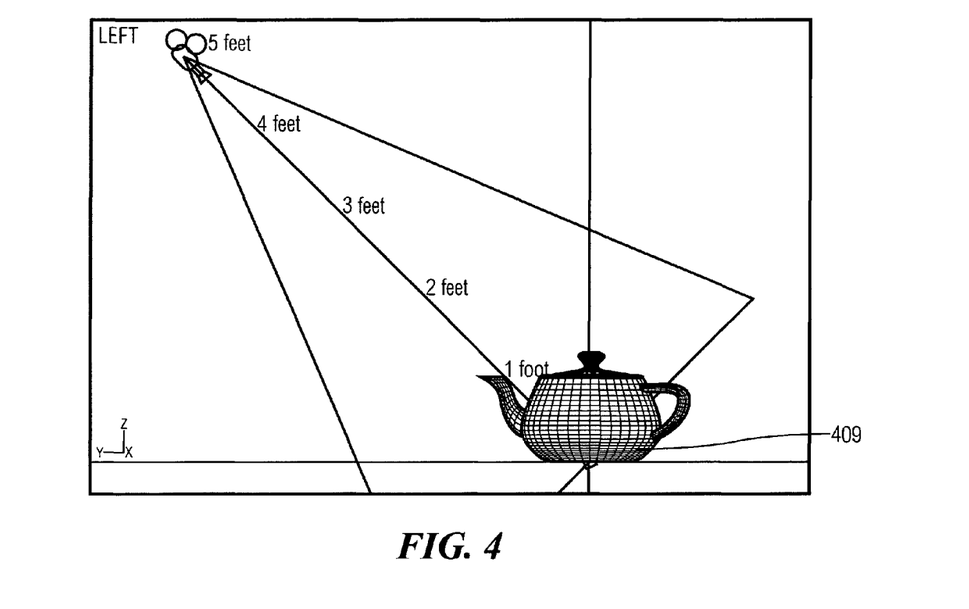
FIG. 4 is a fourth screen shot at a fourth stage in an exemplary form of the methodology.
Figure 5:
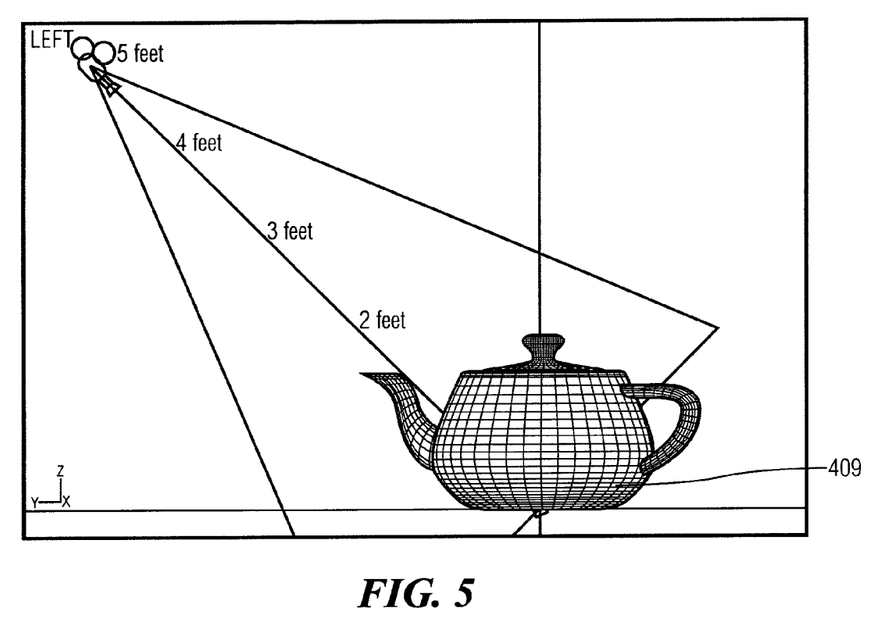
FIG. 5 is a fifth screen shot at a fifth stage in an exemplary form of the methodology.

A virtual three dimensional model 409 of an object is placed or merged into the virtual three dimensional space 101 and located at the desired position 103 on the ground plane 101 (1805). As shown in FIG. 5, the model 409 is then rescaled or tapered (1806) using the real world dimensions on the virtual three dimensional space 100 so that the model 409 is the correct size for the final reproduction on the planar substrate. The virtual model 409 may be surface textured before being merged into the virtual three dimensional space 100.

Figure 6:
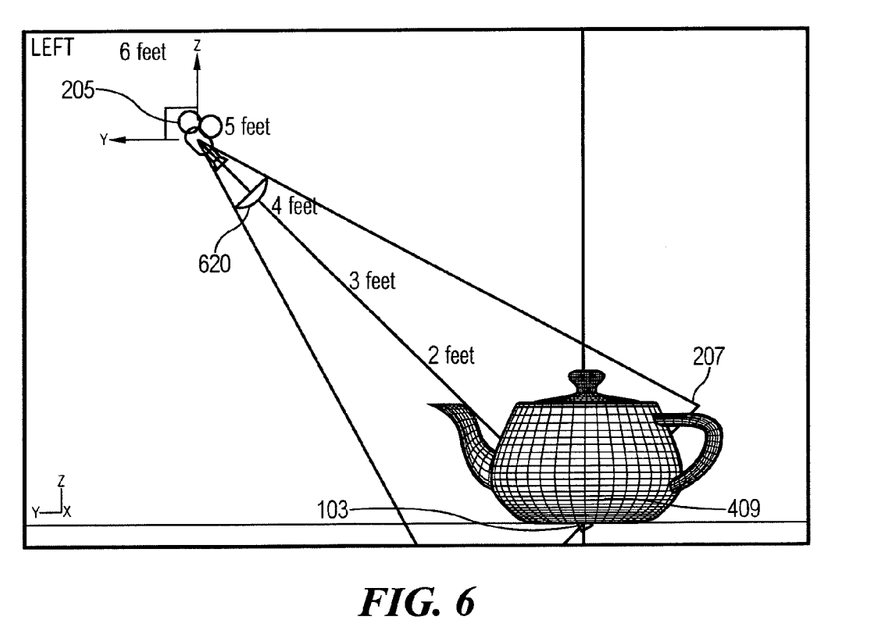
FIG. 6 is a sixth screen shot at a sixth stage in an exemplary form of the methodology.

The focal length of the virtual camera 205 is then set to give the best result for the captured rendered image (1807). The angle of field 620 is set to ensure all of the virtual three dimensional model 409 is able to be captured by the virtual camera 205.

Figure 7:
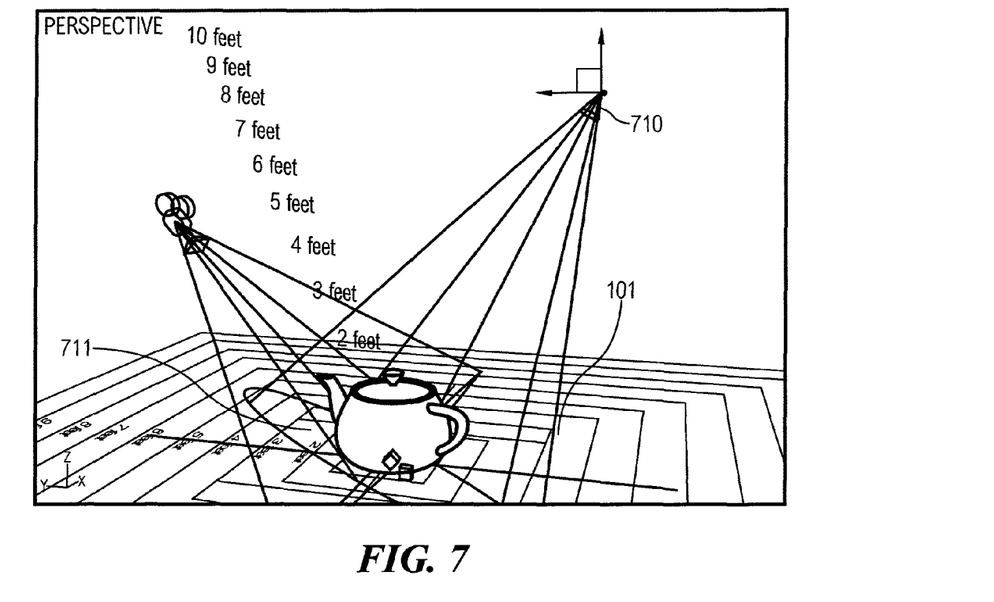
FIG. 7 is a seventh screen shot at a seventh stage in an exemplary form of the methodology.
Figure 8:
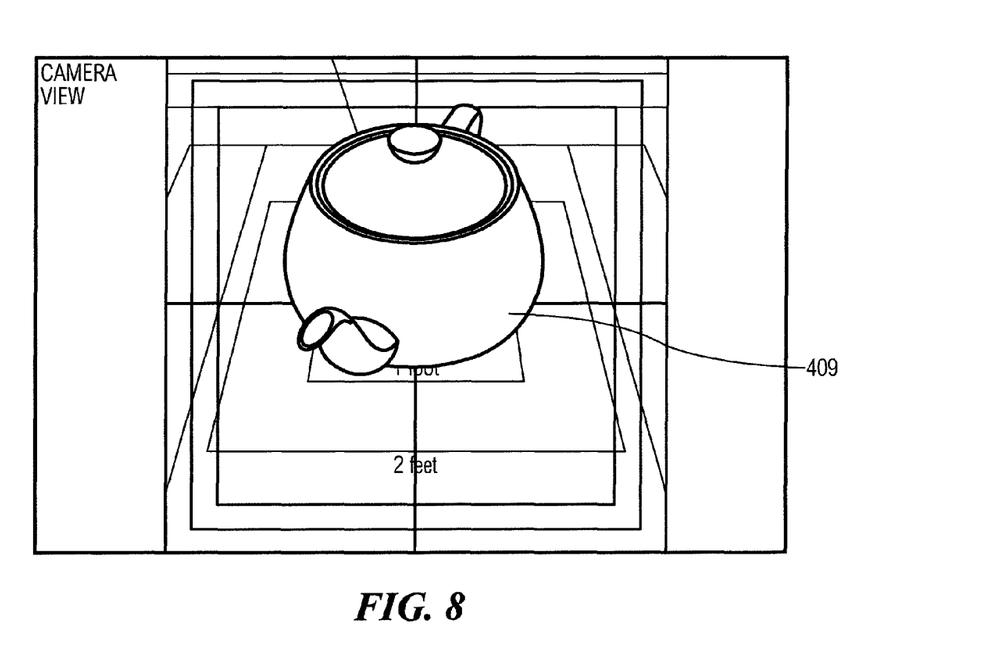
FIG. 8 is an eighth screen shot at an eighth stage in an exemplary form of the methodology.

Virtual lighting 710 is added to the virtual three dimensional space 100 to create shadows 711 of the virtual model 409 on at least the ground plane 101 (1808). The virtual lighting 710 also assists in creating a sense of depth in the captured rendered image. The location and strength of the virtual lighting 710 will be to maximise the three-dimensional effect by creating shadows. Its location and strength will therefore depend on the shadows 711 required, and the proposed location of the planar substrate. If the planar substrate is to be in a location with directional lighting, the location and strength of the virtual lighting 710 must match that of the location to achieve a realistic effect. If the location has relatively uniform lighting, the location and strength of the virtual lighting 710 can be selected to give the best shadow and depth effects. The virtual lighting 710 may be a plurality of virtual light sources. The virtual lighting 710 may be above the ground plane 101 at a height greater than the predetermined height, and may be between the desired position 103 and the first position 206. Alternatively, it may be behind the desired position 103 to have the shadow project forward, or may be above the desired location to give a suspended-above-the-ground effect.

Figure 9:
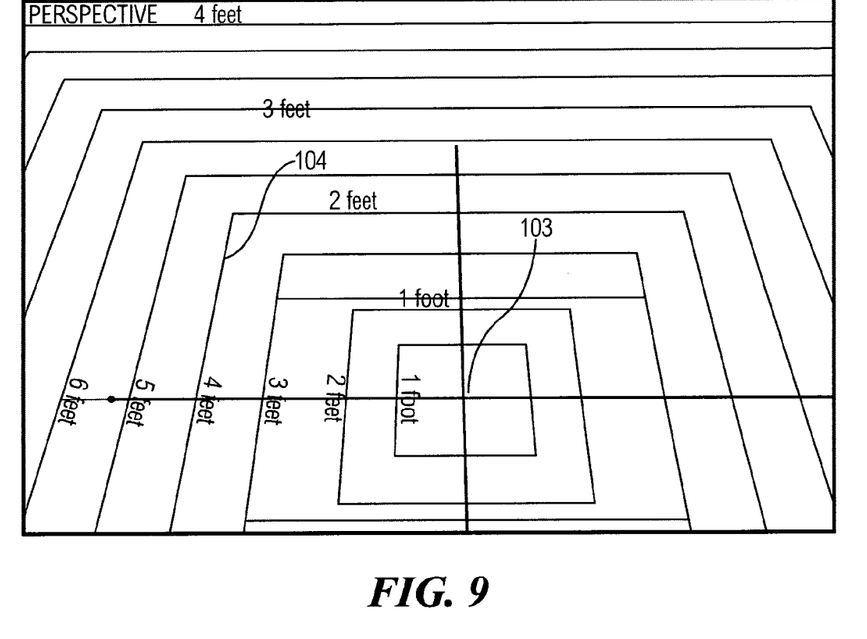
FIG. 9 is a ninth screen shot at a ninth stage in an exemplary form of the methodology.
Figure 10:
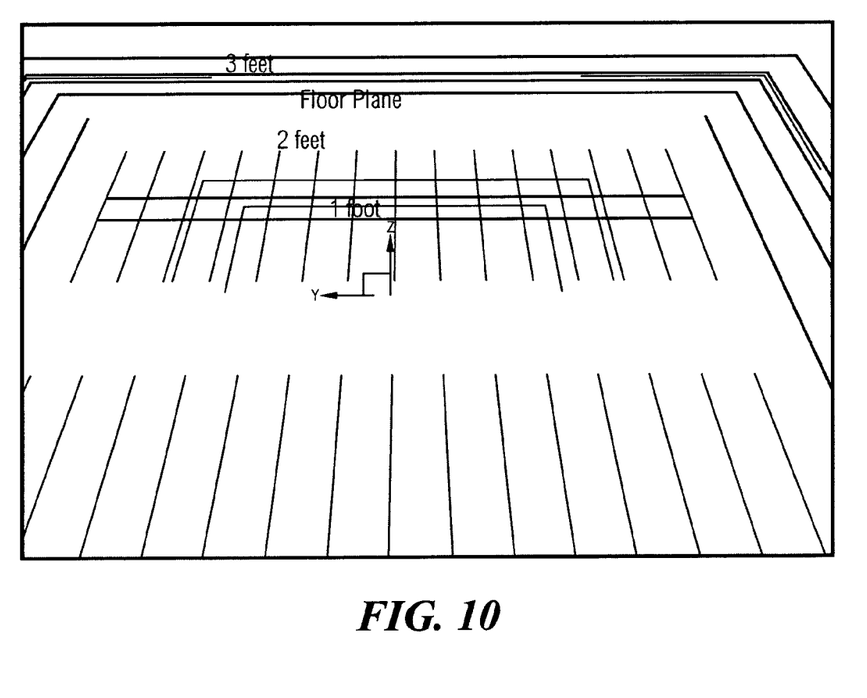
FIG. 10 is a tenth screen shot at a tenth stage in an exemplary form of the methodology.
Figure 11:
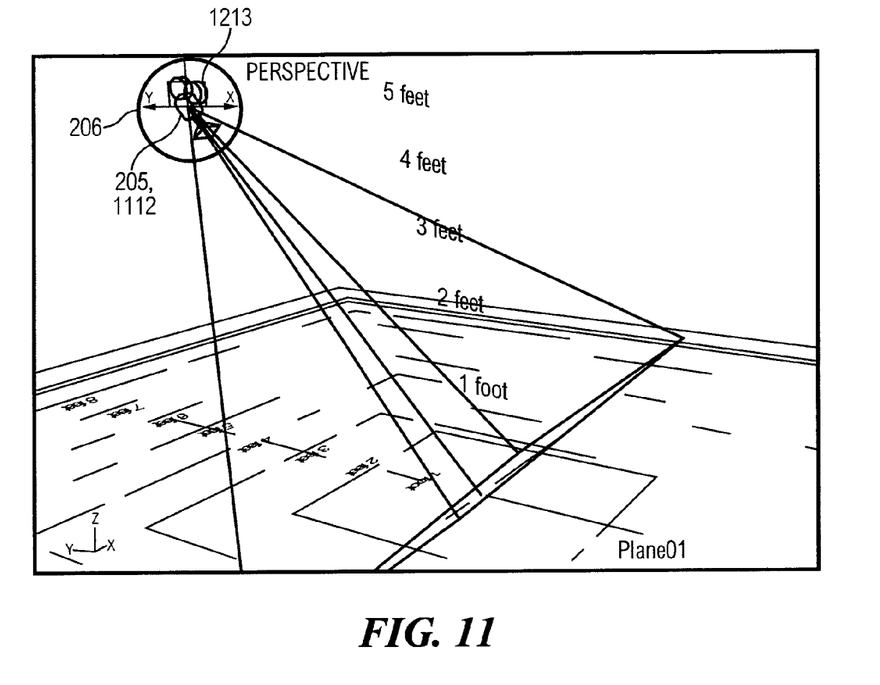
FIG. 11 is an eleventh screen shot at an eleventh stage in an exemplary form of the methodology.

The first virtual camera 205 is then used for rendering of the virtual model 409 and the shadows 711 (1809) to obtain a rendered image. The virtual model 409 is removed (1810) and as shown in FIGS. 9 and 10 the virtual three dimensional space 100 is scaled to enable the projection of the rendered image onto the ground plane 101 to be of the correct size for the reproduction of the rendered image on the planar substrate (1811). By having the dimensions in the virtual three dimensional space 100 in "real world" dimensions, this is facilitated.

Figure 12:
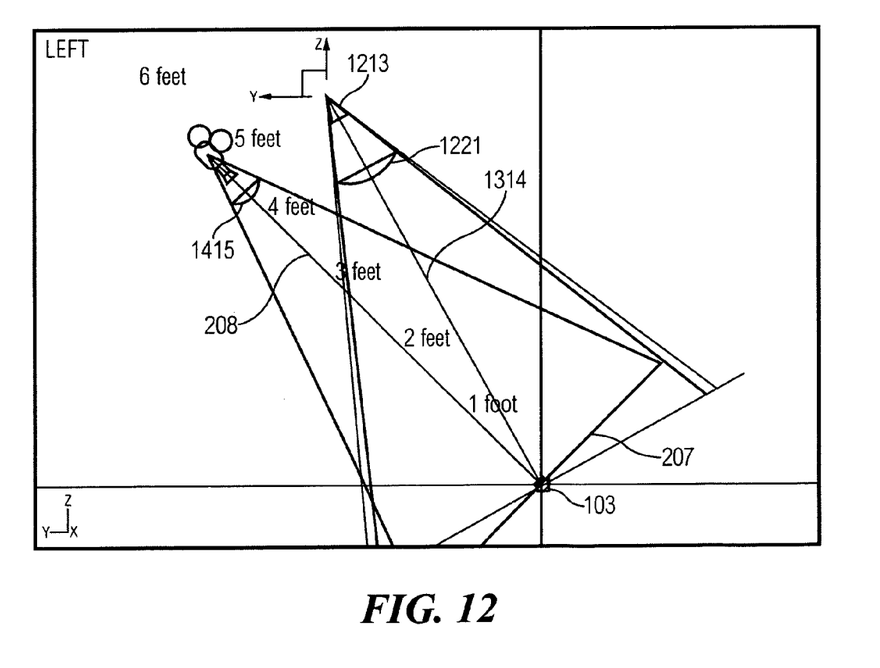
FIG. 12 is a twelfth screen shot at a twelfth stage in an exemplary form of the methodology.
Figure 13:
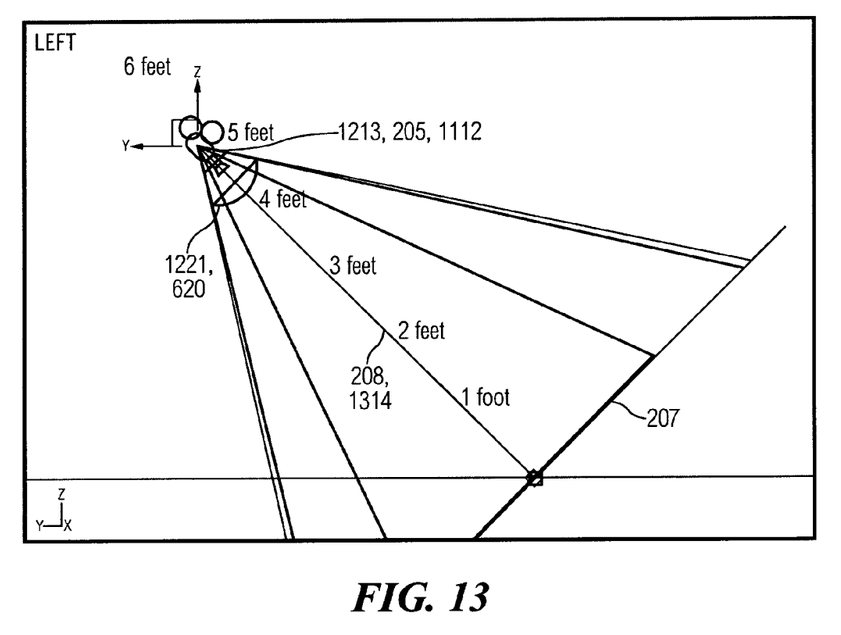
FIG. 13 is a thirteenth screen shot at a thirteenth stage in an exemplary form of the methodology.
Figure 14:
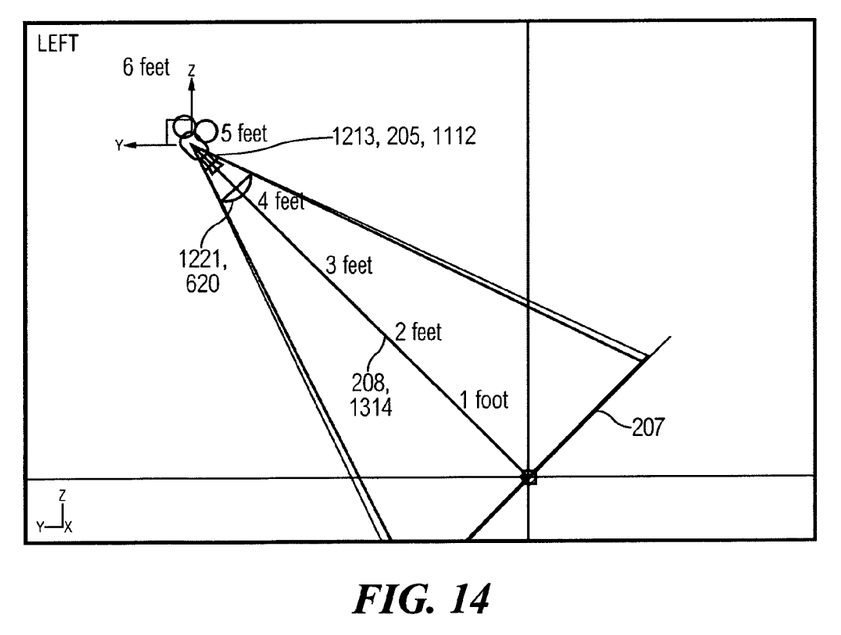
FIG. 14 a fourteenth screen shot at a fourteenth stage in an exemplary form of the methodology.

The virtual camera 205, or an alternative virtual camera 1112, is placed in the virtual three dimensional space 100 at the first position 206 (1812) and a virtual projection light source 1213 added to the virtual three dimensional space 100 also at the first position 100 (1813). As shown on FIGS. 12 to 14, the projection light source 1213 and the camera 205 or 1112 are aligned with their central, longitudinal axis 1314 of their projection being coincident with the axis 208 (1814). The spotlight parameters (including beam angle 1221) of the virtual projection light source 1213 are adjusted to be the same as the angle of field 620 of the virtual camera 205 or 1112 (1815).

Figure 15:
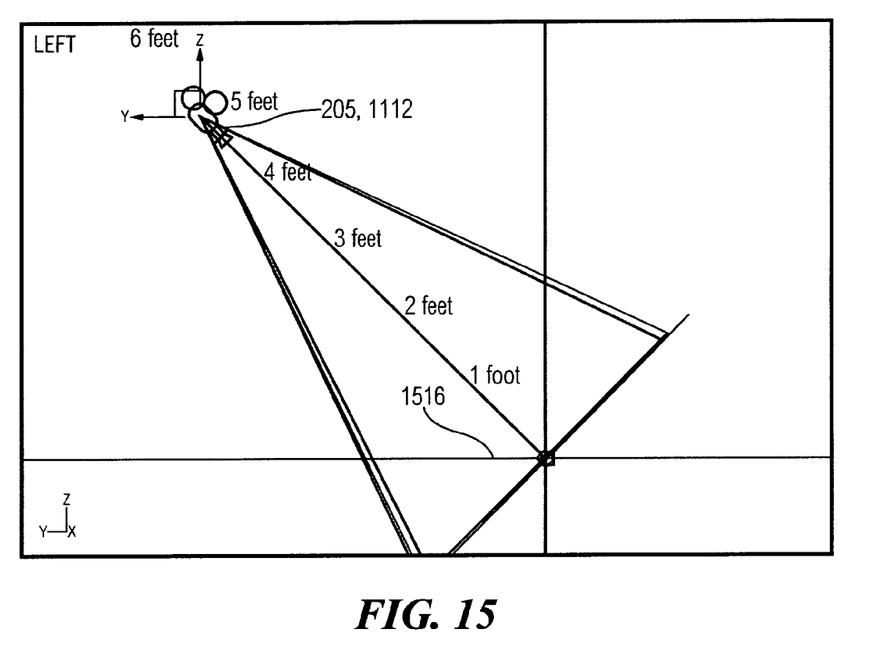
FIG. 15 is a fifteenth screen shot at a fifteenth stage in an exemplary form of the methodology.

The rendered image captured at (1809) is then attached to the projector that may be the virtual light source 1213 or may be a combination of the virtual projection light source 1213 and the camera 205/1112 (1816). The rendered image is projected onto the ground plane 101 (1817) to give a distorted, projection of the rendered image 1516. As the projection is from the first position it is from the viewer's position—the position from which the final three dimensional image is intended to be viewed.

Figure 16:
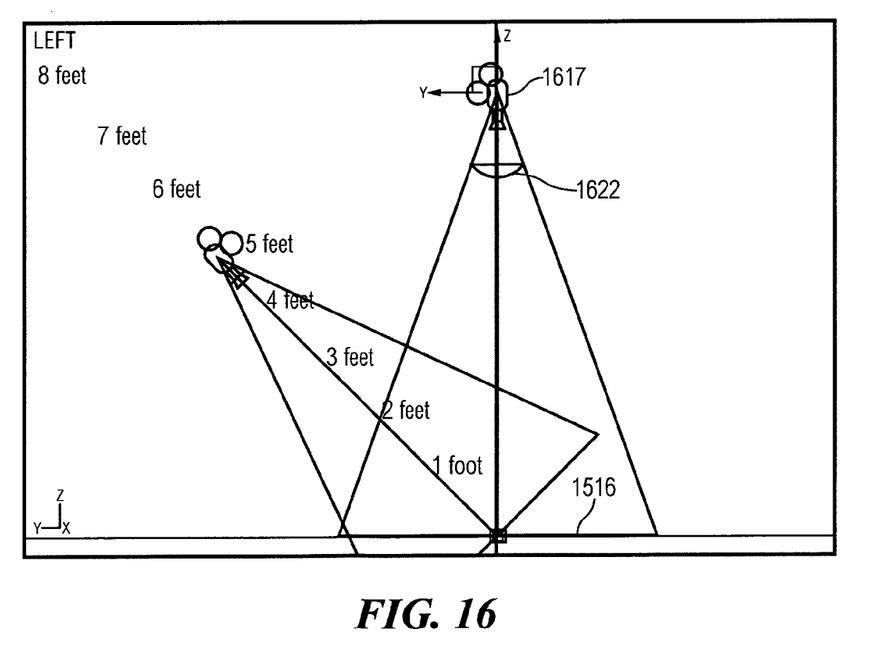
FIG. 16 is a sixteenth screen shot at a sixteenth stage in an exemplary form of the methodology.
Figure 17:
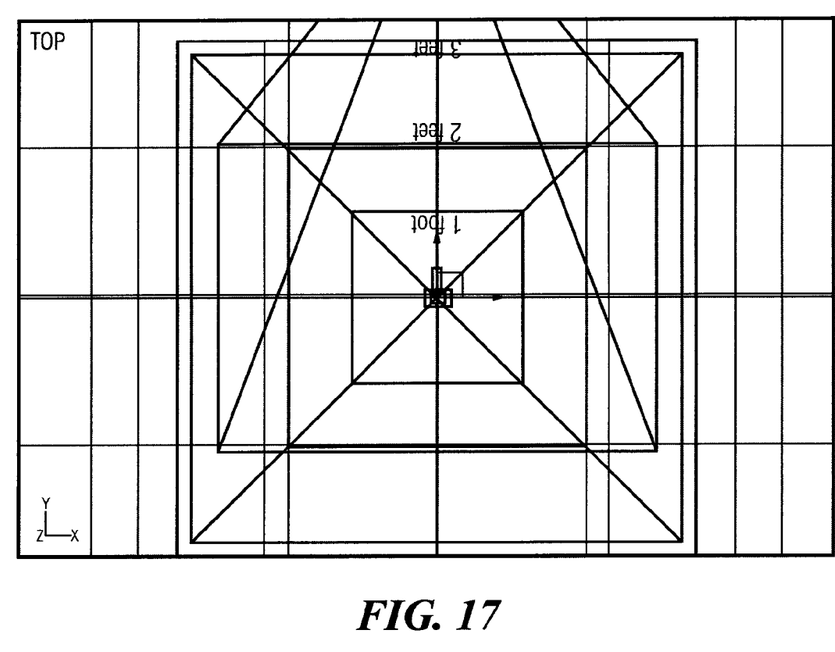
FIG. 17 is a seventeenth screen shot at a seventeenth stage in an exemplary form of the methodology.

A second virtual camera 1617 is added to the virtual three dimensional space 100 (1818) preferably vertically above the projection of the rendered image 1516. The second virtual camera 1617 has its angle of field 1622 set according to the dimensions of and distance from the projection 1516 of the rendered image (1819). The second virtual camera 1617 is used to capture a virtual three dimensional image of the projection of the rendered image 1516 on the ground plane 101 (1820) to enable reproduction of the virtual three dimensional image on the at least one planar substrate (1821). In this way the virtual three dimensional image can be commercially reproduced in commercial quantities for commercial use in advertising, marketing, promotion, public notices, and so forth, all being placed on a pavement, ground, sidewalk, floor, or other suitable flat surface. The second virtual camera 1617 may be a virtual orthographic camera in which case it will not require adjustment of its focal length as with a virtual orthographic camera the focal length is set at infinity. The second virtual camera 1617 is preferably located above a centre of the projection 1516.

If the object is actually a plurality of individual objects, scaling may be performed for retention of correct proportionality in the size of the virtual model of each of the individual objects. It is also preferred that the reproduced virtual three dimensional image has a length and width that are the same.

Figure 19:
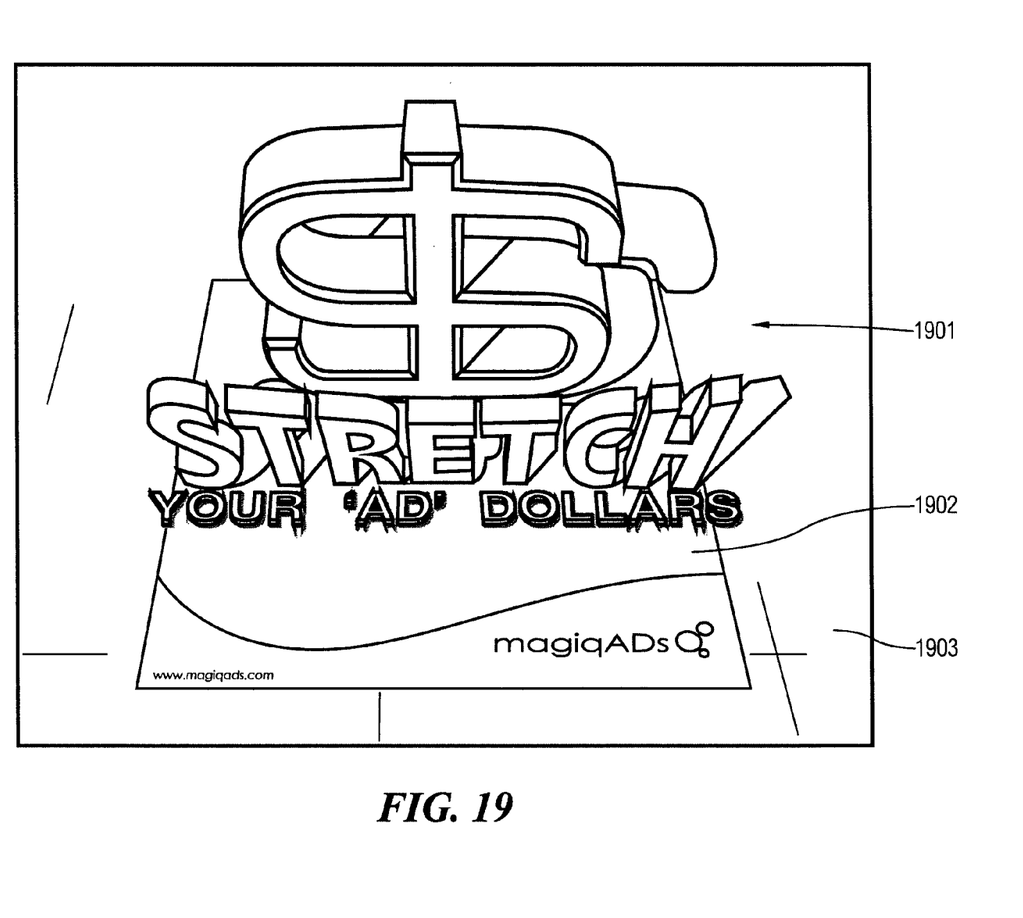
FIG. 19 is a representation of a three dimensional image reproduced on a substrate.

FIG. 19 shows a three-dimensional image 1901 reproduced on a substrate 1902 and mounted on a floor 1903.

Whilst there has been described in the foregoing description preferred embodiments of the present invention, it will be understood by those skilled in the technology concerned that many variations in details of design, construction and/or operation may be made without departing from the present invention.

The invention claimed is:

1. A method of creation of a virtual three dimensional image to enable its reproduction on at least one planar substrate, the method comprising:
creating a virtual three dimensional space that includes a ground plane;
merging a virtual model of an object into the virtual three dimensional space and locating the virtual model at a desired position on the ground plane;
placing a first virtual camera at a first position in the virtual three dimensional space;
adding virtual lighting to the virtual three dimensional space to create shadows of the virtual model on at least the ground plane;
using the first virtual camera to obtain a rendered image of the virtual model and the shadows;
removing the virtual model and projecting the rendered image onto the ground plane using a virtual light projector from the position of the first virtual camera;
placing a second virtual camera, in the form of an orthographic virtual camera, vertically above a center of the projection of the rendered image on the ground plane and using the second virtual camera to capture the virtual three dimensional image of the projection of the rendered image on the ground plane to enable reproduction of the virtual three dimensional image on the at least one planar substrate; and
wherein, the virtual lighting is selectable to match the lighting of the intended location of the virtual three dimensional image.

2. A method as claimed in claim 1, characterized in that the method further comprises scaling the virtual model before adding the virtual lighting; the virtual model of the object being surface textured before being merged into the virtual three dimensional space.

3. A method as claimed in claim 1, characterized in that the desired position is a center of the virtual three dimensional space; the first position being:
  i. remote from the desired position,
  ii. a predetermined height above the ground plane,
  iii. a predetermined distance from the desired position,
  iv. an average height of human eyes above ground level, and
  v. represents a viewer's point of view.

4. A method as claimed in claim 2, characterized in that the object comprises a plurality of individual objects, scaling being performed for retention of correct proportionality in the size of the virtual model of each of the individual objects; and rescaling of the virtual model is to the correct size for the final reproduction of the virtual three dimensional image on the planar substrate.

5. A method as claimed in claim 1, characterized in that the virtual three dimensional space uses actual measurement units of the reproduced image on the substrate for height, length and width; and the ground plane comprises a rectangular grid.

6. A method as claimed in claim 1, characterized in that the virtual lighting is above the ground plane at a height greater than the predetermined height, and is between the desired position and the first position; the virtual lighting comprising a plurality of virtual light sources; a biped image being added to the virtual three dimensional space before adding the virtual lighting with the biped image having a height such that eyes of the biped image are the predetermined distance above the ground plane and are at the first position.

7. A method as claimed in claim 1, characterized in that the planar substrate is selected from the group consisting of: a transparency, and decalamania; and is able to be mounted on at least one selected from the group consisting of: a pavement, a ground, a sidewalk, and a floor.

8. A method as claimed in claim 1, characterized in that the first virtual camera focuses on a plane on the ground plane at the desired position, the plane being perpendicular to and centred on a longitudinal axis of a line of sight of the first virtual camera.

9. A method as claimed in claim 1, characterized in that before projecting the rendered image onto the ground plane the virtual three dimensional space is scaled to enable the projection of the rendering onto the ground plane to be of the correct size for the reproduction of the virtual three dimensional image on the planar substrate.

10. A method as claimed in claim 1, characterized in that the projecting the rendered image onto the ground plane is by placing a virtual projection camera in the virtual three dimensional space at the first position and adding a virtual projection light source to the virtual three dimensional space also at the first position; the virtual projection light source and the virtual projection camera being aligned; a central, longitudinal axis of the virtual projection light source and the virtual projection camera being coincident with the longitudinal axis of a line of sight of the first virtual camera; and spotlight parameters of the virtual projection light source are adjusted to be the same as an angle of field of the virtual projection camera; the spotlight parameters comprising beam angle.

11. A method as claimed in claim 10, characterized in that the virtual projection light source and the virtual projection camera combine to form a virtual projector, the rendered image being attached to the virtual projector and projected onto the ground plane to give a distorted, projected image; the virtual projection camera comprising one selected from the group consisting of: the first virtual camera, and an alternative virtual camera.

12. A method as claimed in claim 10, characterized in that the second virtual camera is added to the virtual three dimensional space vertically above the projection of the rendered image with its angle of field according to the dimensions of and distance from the projection of the rendered image.

* * * * *